United States Patent [19]

Marlair

[11] Patent Number: 5,143,697

[45] Date of Patent: Sep. 1, 1992

[54] DEVICE FOR EXTRACTING PARTICULATE MATERIALS OF A FLUIDIZED BED FROM THE FLUIDIZATION ENCLOSURE

[75] Inventor: Guy Marlair, Flers-En-Escrebieux, France

[73] Assignee: Charbonnages De France, Rueil Malmaison Cedex, France

[21] Appl. No.: 524,033

[22] Filed: May 16, 1990

[30] Foreign Application Priority Data

May 19, 1989 [FR] France ............... 89 06562

[51] Int. Cl.$^5$ .................................. B01J 8/18
[52] U.S. Cl. ........................... 422/115; 406/143; 406/146; 422/145; 422/146; 422/213; 422/219
[58] Field of Search ............... 422/145, 146, 219, 213, 422/115; 208/143; 423/239 A, 244, 247; 406/143, 146

[56] References Cited

U.S. PATENT DOCUMENTS 3,134,511  5/1964  Vardanega .
3,336,217  8/1967  Meaux ............................ 422/213
4,738,770  4/1988  Hastings et al. ................ 422/145

FOREIGN PATENT DOCUMENTS 0236647  9/1987  European Pat. Off. .
2356061  5/1975  Fed. Rep. of Germany .
2287277  5/1976  France .

Primary Examiner—Jill A. Johnston
Attorney, Agent, or Firm—Griffin Branigan & Butler

[57] ABSTRACT

The device has an opening provided through a side wall of the fluidization enclosure and a tube extends outside a enclosure and substantially perpendicular thereto. A duct is connected substantially perpendicularly to the tube and extends downwards. A piston is slidably mounted in sealed manner inside the tube to slide between a first position in which it constitutes a panel closing the opening and a second position in which it at least partially uncovers the opening of the duct into the tube, and control means for controlling displacement of the piston inside the tube.

5 Claims, 1 Drawing Sheet

DEVICE FOR EXTRACTING PARTICULATE MATERIALS OF A FLUIDIZED BED FROM THE FLUIDIZATION ENCLOSURE

The present invention relates to a device for extracting particulate material of a fluidized bed from the fluidization enclosure, thereby making it possible either to adjust the level of the bed inside the fluidization enclosure, or else to empty the enclosure, either partially or totally.

BACKGROUND OF THE INVENTION

In general, industrial methods that implement a fluidized bed reactor require means to be installed enabling the particulate materials constituting the fluidized bed(s) inside the reactor to be emptied either totally or in part in order to facilitate operating the reactor.

Partial emptying must be possible while the reactor is in operation since it constitutes one of the ways of controlling changes in the level of the bed, particularly when the level is rising. This occurs, for example, when the flow of elutriated inert particles is less than the mass flow rate of inert particles entering a combustion reactor.

Total emptying is required in order to proceed with periodic inspections of the reactor or during emergency stops of an installation.

These emptying devices must satisfy several severe requirements that result essentially from the physical and thermal characteristics of the bed in operation. These devices are subjected to mechanical and thermal stresses which are large since they are in contact with a medium which is often highly abrasive, at high temperature, and which exerts significant pressure. Since, in addition, they provide communication between the bed and the outside, they often need to provide sealed closure of the enclosure and must be thoroughly cooled in operation in order to ensure safety of equipment and personnel. They must also occupy minimum bulk in order to be capable of being controlled automatically without disturbing the fluidization hydrodynamic regime.

Devices known in the past for performing this function satisfy these requirements to a limited extent only. Overflow orifices are known, as are purge drains disposed vertically or at a very steep slope in the bottom of the fluidization enclosure and fitted with cellular air locks or with guillotine traps for closure or opening purposes.

Devices are also known having transfer fluidized beds or cooled Archimedes screws for extracting particles associated with classifiers.

Most of these systems are disposed at the ends of vertical or very steeply sloping ducts and which are filled with material when the device is not operating, said material forming a plug or blocking the mechanisms due to the fact that said material clogs, compacts, and may even agglomerate by chemical or thermal reaction with these ducts often suffering from hot spots.

In addition, the height of these ducts is a factor that increases the hydrostatic pressure exerted on the extraction devices, thereby making sealing more difficult to achieve.

Finally, in addition to the drawbacks relating to the large size of these devices and to the complexity of the cooling means they require, it is often necessary to provide special equipment downstream for processing and taking up the products extracted in this way from the fluidized bed.

The invention seeks to remedy these drawbacks by providing a device of much simpler design for extracting particulate material, the device being easy of access and protected from the thermal point of view (when applied to a heat generator), and being very easily connected to an automatic mechanism for controlling its operation.

SUMMARY OF THE INVENTION

To this end, the present invention provides a device for extracting particulate material of a fluidized bed from the fluidization enclosure in order to regulate the level of the bed inside the enclosure or in order to empty the enclosure, the device comprising:

an opening provided through a side wall of the fluidization enclosure and extended outside the enclosure by a tube which extends substantially perpendicularly to the side wall;

a duct connected substantially perpendicularly to said tube and extending downwards;

a piston slidably mounted in sealed manner inside the tube to slide between a first position in which it constitutes a panel shutting the opening and a second position in which it at least partially uncovers the opening of the duct into the tube; and control means for displacing the piston inside the tube.

In a particular application of the device of the invention to a fluidized bed heat generator including a double-walled outer shell including means between the walls for feeding and removing a flow of water which surrounds a hearth, the tube passes in sealed manner through the peripheral shell and the duct is connected to the tube between the two walls of the shell. When the heat generator includes a hollow peripheral shell delimiting an intermediate volume adjacent to the hearth for the passage of smoke together with a manifold at its bottom end for collecting and removing ash, the tube passes through the said intermediate volume which constitutes the above-mentioned duct into which the tube opens out via a lower lateral opening. In this case, the presence of the intermediate volume further facilitates providing sealing between the reactor and the outside atmosphere, given that it operates like an air lock.

BRIEF DESCRIPTION OF THE DRAWINGS

Embodiments of the invention are described by way of example with reference to the accompanying drawings, in which.

DETAILED DESCRIPTION

Figure 1:
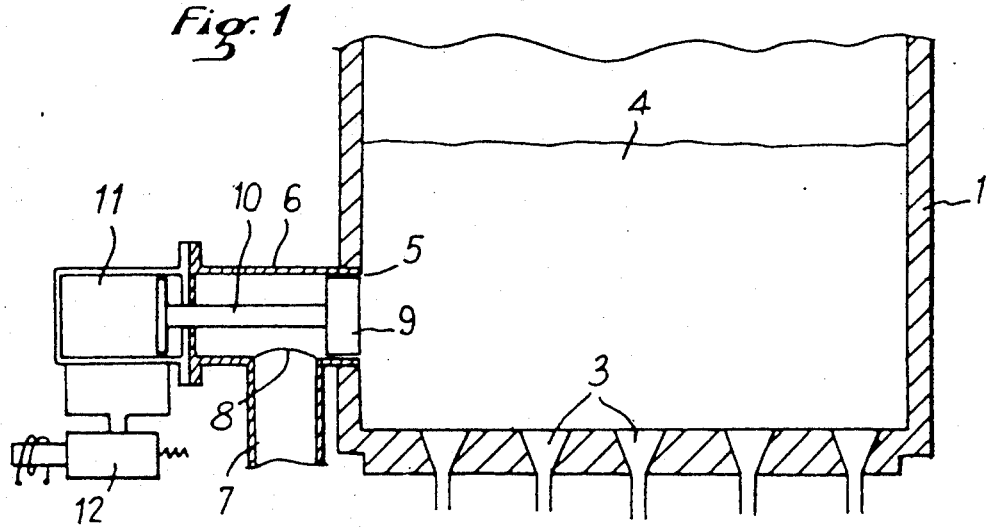
FIG. 1 shows a device of the invention adapted to the enclosure of a fluidized bed reactor, with a control valve for control thereof.

Reference is made initially to FIG. 1, which shows the device of the invention fitted to a fluidization enclosure 1 which is itself known, and in particular which is known for possessing a fluidization grid 2 (see FIG. 3) through which a gas is blown (via openings 3) to form a fluidized bed 4 of particulate material.

The enclosure 1 includes an opening 5, preferably situated close to the fluidization grid 2 and extended to the outside by a tube 6. The tube is preferably horizontal and a duct 7 is connected thereto so that their geometrical axes intersect. The duct 6 is vertical or steeply sloping (close to the vertical) and opens out into the tube 6 via an opening 8 situated in the bottom of the tube 6. The diameter of the duct 7 may be equal to or less than the diameter of the tube 6. The tube 6 constitutes a guide jacket for a moving closure device for the opening 5. This device comprises a piston 9 whose diameter is slightly less than the inside diameter of the tube 6 (assuming their sections are circular) in order to enable it to slide properly therein while providing adequate sealing. The piston 9 is fixed to a rod 10 which constitutes the rod of an actuator 11 carried at the far end of the tube 6, serving to control operation of the piston 9 along the tube 6. The figure shows an electrically controlled valve 12 which symbolizes the control member for the actuator 11, said electrically controlled valve being the actuator of a servo-control system including detectors for detecting the level of the bed 4 in the enclosure 1, for example, or else being controlled by a programmable controller.

It will be understood that the operation of the device is extremely simple. The piston 9 is displaced to the left in the figure through an amplitude such that when the enclosure is to be emptied, the opening 8 is opened, thereby putting the inside of the enclosure into communication with the duct 6 which leads to a receptacle for the product (not shown). Displacement of the piston to the right interrupts such communication.

The device is advantageously adapted to being used as a regulator by repeated opening and closing actions. The cycle of these operations is very easily selected as a function of the flow rates to be removed, by means of timers for modulating heat exchanges.

It is also suitable for completely emptying the bed by holding the valve 12 in the appropriate position and by allowing the installation to empty completely.

This device is well adapted to an application where it is associated with a fluidization method using a grid with upwardly flared openings generating a non-segregating fluidization of the particles (with examples of such grids being shown in patent documents FR-A-2 519 877 and 2 588 772).

FIG. 1 shows that the members 11 and 12 for controlling the piston 9 are at a distance therefrom and are thus easily separated for maintenance and repairing. In addition, the distance increases thermal insulation, thereby improving life time and constituting a safety factor for operating personnel.

Figure 2:
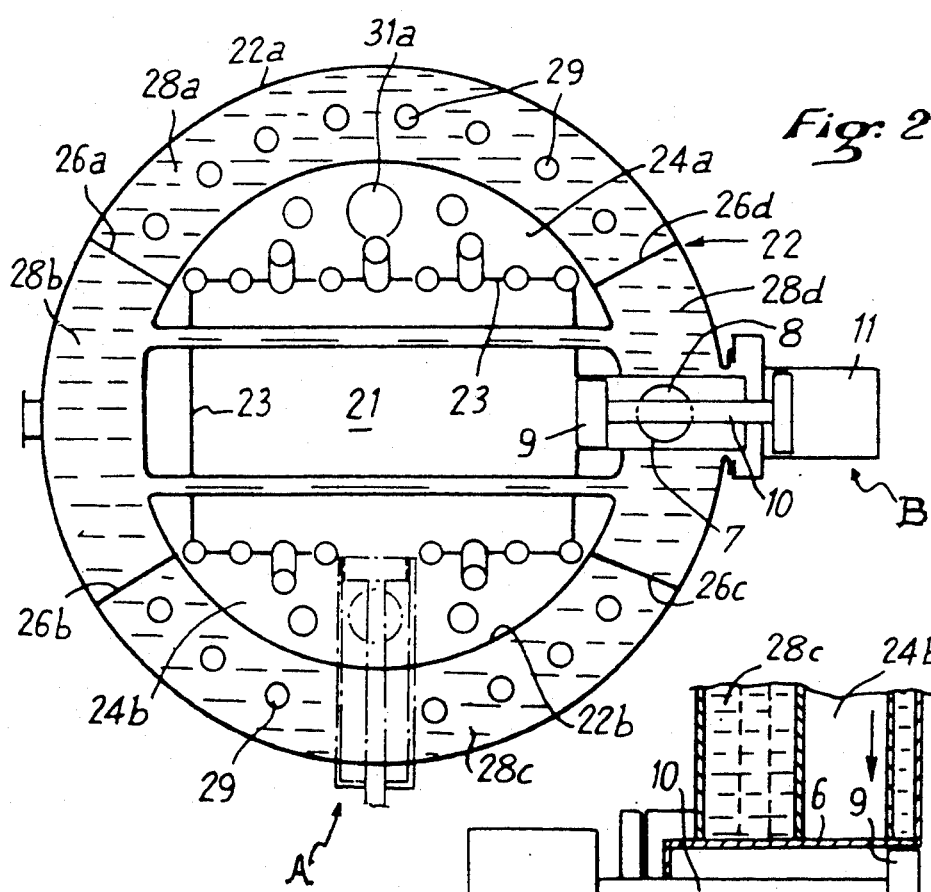
FIGS. 2 and 3 show two modifications of the device of FIG. 1 used with a heat generator having a hollow wall with water circulation, smoke circulation, and ash recovery with the control valve of FIG. 1 not being shown.
Figure 3:
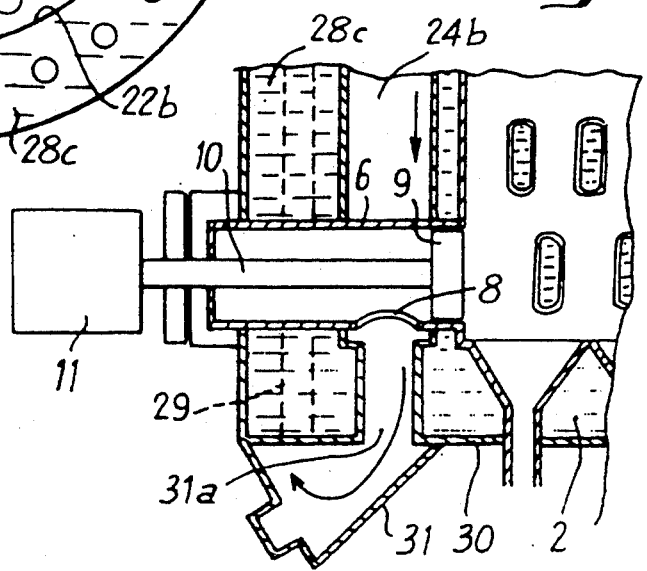

FIGS. 2 and 3 show a portion of a heat generator-reactor as described in Document FR-A-2 591 722 providing two advantageous applications for the device of the invention. It is briefly recalled that this generator is a generator comprising a fluidized bed hearth having a side wall of conventional type and a hollow peripheral shell 22 having two walls 22a and 22b with water flowing therebetween, which water surrounds the hearth 21 and, together with the side wall 23 of the hearth, delimits an intermediate volume 24a or 24b.

The overall shape of the hearth 21 is rectangular in this case. The peripheral shell 22 is cylindrical and together with the hearth 21 it delimits two distinct and opposite intermediate volumes 24a and 24b each situated adjacent to one of the long sides of the hearth 21.

Between its walls 22a and 22b, the peripheral shell 22 is subdivided by radial internal partitions 26a, 26b, 26c, and 26d forming four compartments which are opposite one another in pairs. Two opposite compartments, 28a and 28c occupying the larger circumferential extent contain vertical tubes 29 through which smoke flows, said tubes opening out into an ash collector 31 (see FIG. 3) which extends beneath the bottom wall 30 and which communicates via a bottom passage 31a with a corresponding intermediate volume 24b (see FIG. 3). Combustion smoke coming from the hearth goes down inside the intermediate volume 24a and 24b, passes through the ash collectors 31 and rises up the tubes 29 in order to reach an outlet duct.

FIG. 2 shows, overall, two possible ways A and B whereby this generator may be fitted with the device of the invention.

At A, i.e. the application shown in section in FIG. 3, the duct 7 is omitted and replaced by the intermediate volume 24b opening out into the ash collector 31 for collecting ash (or products to be removed). Smoke flowing in the direction of the arrows is already cooled and therefore co-operates in the cooling of the jacket or tube 6.

At B, in FIG. 2, the duct 7 passes through the compartment 28d. It is thus completely immersed in this compartment and is therefore cooled thoroughly. Substances may subsequently be recovered by means of a hopper similar to the ash collector 31 shown in FIG. 3.

The invention provides numerous advantages, and in particular:

reduced bulk by being integrated in the very structure of the reactor;

no special cooling devices;

sealing facilitated by a shutter which is subjected solely to the hydrostatic thrust of the bed and by means of a system acting as an air lock or taking advantage of an existing air lock;

no ducting liable to contain defluidized products, i.e. running the risk of overheating;

maintenance facilitated by the ease of access to the control members from the outside of the reactor; and finally ordinary quality materials can be used because of the effective cooling.

I claim:

1. A device for extracting particulate material from a fluidized bed thereof contained in a fluidization enclosure the device comprises:

a fluidization enclosure containing an enclosure opening provided through a side wall of the fluidization enclosure, said enclosure opening communicating with a tube such that the tube extends outside the fluidization enclosure, said tube being further constructed so as to extend perpendicularly to the side wall;

a duct having a duct opening connected substantially perpendicularly to said tube and extending downwards;

a piston slidably mounted in sealed manner inside the tube, said tube being constructed so as to allow the piston to slide between a first position and a second position, wherein said piston is constructed so as to shut the enclosure opening when in said first position and further constructed so as to at least partially uncover said enclosure opening of said duct when at the second position so as to provide flow communication between said opening of said enclosure and said duct opening of said duct; and control means for displacing the piston inside the tube between said first position and said second position.

2. A device according to claim 1, wherein the piston is fixed to a rod extending along the longitudinal axis of tube and in a direction away from said enclosure opening, with the control means being coupled to said rod and supported by the tube.

3. A device according to claim 1, wherein the enclosure opening is substantially adjacent the bottom of the fluidization enclosure.

4. A device according to claim 1, wherein the fluidization enclosure is a fluidized bed heat generator having a double walled peripheral shell with water flowing therebetween, and wherein the tube is sealed from the peripheral shell and wherein the duct is connected to the tube at a position lying between the two walls of the shell.

5. A device according to claim 1, wherein the fluidization enclosure is a fluidized bed heat generator having a hollow peripheral shell with an intermediate volume adjacent to a hearth for passing smoke through the intermediate volume and having a collector at the bottom of the shell for collecting an extracting ash therefrom, and wherein the tube passes through the intermediate volume.

* * * * *